United States Patent
Satou et al.

(10) Patent No.: US 12,546,750 B2
(45) Date of Patent: Feb. 10, 2026

(54) PHYSICAL QUANTITY MEASUREMENT DEVICE

(71) Applicant: Panasonic Intellectual Property Management Co., Ltd., Osaka (JP)

(72) Inventors: Masato Satou, Nara (JP); Motoyuki Nawa, Nara (JP); Asako Miyoshi, Kyoto (JP); Masataka Matsuda, Kyoto (JP); Yuuji Nakabayashi, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 477 days.

(21) Appl. No.: 18/013,698

(22) PCT Filed: Jul. 16, 2021

(86) PCT No.: PCT/JP2021/026856
§ 371 (c)(1),
(2) Date: Dec. 29, 2022

(87) PCT Pub. No.: WO2022/024821
PCT Pub. Date: Feb. 3, 2022

(65) Prior Publication Data
US 2023/0296568 A1 Sep. 21, 2023

(30) Foreign Application Priority Data
Jul. 30, 2020 (JP) ................. 2020-128811

(51) Int. Cl.
| | |
|---|---|
| *G01N 29/32* | (2006.01) |
| *G01F 1/667* | (2022.01) |
| *G01N 29/024* | (2006.01) |
| *G01N 29/22* | (2006.01) |

(52) U.S. Cl.
CPC ............. *G01N 29/32* (2013.01); *G01F 1/668* (2013.01); *G01N 29/024* (2013.01); *G01N 29/222* (2013.01)

(58) Field of Classification Search
CPC .... G01N 29/32; G01N 29/024; G01N 29/222; G01N 2291/02809; G01N 2291/02836; G01N 2291/102; G01F 1/668; G01F 1/662; G01F 1/667; G01F 1/74
See application file for complete search history.

(56) References Cited

U.S. PATENT DOCUMENTS 7,661,302 B2 * 2/2010 Gysling .................... G01F 1/36
73/200
2016/0313160 A1 * 10/2016 Ueberschlag ........ G01N 29/323

FOREIGN PATENT DOCUMENTS

| JP | 60-137324 | 9/1985 |
| JP | 9-43015 | 2/1997 |

(Continued)

OTHER PUBLICATIONS

International Search Report issued Aug. 24, 2021 in International (PCT) Application No. PCT/JP2021/026856.

(Continued)

*Primary Examiner* — Tarun Sinha
(74) *Attorney, Agent, or Firm* — Wenderoth, Lind & Ponack, L.L.P.

(57) ABSTRACT

The physical quantity measurement device includes a secondary flow path disposed outside a multilayer unit and configured to connect an upstream opening to a downstream opening. The secondary flow path is disposed gravitationally below a primary flow path. Ultrasonic transducers are disposed to project into a flow in the multilayer unit. In the thus-configured physical quantity measurement device, the entry of water droplets into an ultrasonic propagation path and the adhesion of water droplets to the ultrasonic transducers are substantially prevented, so that, even when the (Continued)

fluid flowing in contains water droplets, the physical quantity measurement device can measure the flow rate of the fluid and the concentration of components contained in the fluid.

22 Claims, 5 Drawing Sheets

(56) References Cited

FOREIGN PATENT DOCUMENTS

| | | |
|---|---|---|
| JP | 2003-185477 | 7/2003 |
| JP | 2004-144563 | 5/2004 |
| JP | 2005-43207 | 2/2005 |
| JP | 2006-208404 | 8/2006 |
| JP | 2007-240159 | 9/2007 |

OTHER PUBLICATIONS

Japanese Office Action issued Jan. 4, 2024 in corresponding Japanese Patent Application No. 2023-151512, with English translation.
Extended European Search Report issued Dec. 15, 2023 in corresponding European Patent Application No. 21851015.4.
Notice of Reasons for Refusal issued Oct. 31, 2024 in corresponding Japanese Patent Application No. 2024-042707, with English language translation.
Office Action issued Jul. 29, 2025 in corresponding Chinese Patent Application No. 202180059876.1, with English translation, 20 pages.

* cited by examiner

ULTRASONIC PROPAGATION PATH

PHYSICAL QUANTITY MEASUREMENT DEVICE

BACKGROUND

1. Technical Field

The present disclosure relates to a physical quantity measurement device configured to remove the influence of water droplets from a fluid containing water and measure the flow rate of the fluid or the concentration of components contained in the fluid.

2. Description of the Related Art

There is a measurement device required to measure the flow rate of a fluid or the concentration of components contained in the fluid without the influence of water droplets contained in the fluid.

As a conventional measurement device configured to measure the flow rate of a fluid, there is known a measurement device in which a measurement flow path is divided into two or more to increase the two-dimensionality of a flow, whereby measurement accuracy is enhanced (for example, see Japanese Unexamined Patent Application Publication No. H9-43015).

FIG. 5 is a cross-sectional view of a configuration of a conventional ultrasonic flowmeter.

In this ultrasonic flowmeter, measurement flow path 101 is divided into a plurality of layers by a plurality of partition plates 102, whereby multilayer flow path 103 is formed. Chambers 104 are provided on the upstream side and the downstream side of multilayer flow path 103, respectively. A pair of ultrasonic transducers 105 is disposed to face each other via chambers 104.

This ultrasonic flowmeter is configured to perform flow rate measurements by propagating ultrasonic waves in multilayer flow path 103 to measure a flow velocity.

However, in the conventional configuration, when water droplets get mixed in a fluid, the water droplets also get mixed in a multilayer unit, and accordingly there is a possibility that ultrasonic waves are inhibited from propagating to cause a decrease in the accuracy of measurement by the ultrasonic waves. Furthermore, the water droplets having collected in the multilayer unit cannot be discharged, and accordingly there is a possibility that the device cannot be used due to the collected water droplets. Furthermore, in the configuration, the chamber occupying a large space on the upstream side and the downstream side of the measurement flow path is provided, whereby the measurement device is larger in size and it is difficult to make the device smaller and compacter.

SUMMARY OF THE INVENTION

The present disclosure provides a physical quantity measurement device capable of, even when a fluid in a gas phase contains water droplets, measuring the flow rate of the fluid and the concentration of components contained in the fluid.

The physical quantity measurement device according to the present disclosure includes: a primary flow path having a rectangular cross section and configured to allow a measurement target fluid to flow therethrough; a multilayer unit in which a partition plate configured to divide the primary flow path into a plurality of layers is disposed; a pair of ultrasonic transducers disposed in the multilayer unit; an upstream opening provided on the upstream side of the multilayer unit; a downstream opening provided on the downstream side of the multilayer unit; a secondary flow path provided outside the multilayer unit and configured to connect the upstream opening to the downstream opening; a temperature sensor configured to detect a temperature of the measurement target fluid; and a signal processor configured to receive signals from the pair of the ultrasonic transducers and a signal from the temperature sensor and measure the flow rate of the fluid and the concentration of components in the fluid. The secondary flow path is positioned below the primary flow path in the gravity direction. The upstream opening is disposed in the vicinity of an upstream end of the multilayer unit, meanwhile the downstream opening is disposed in the vicinity of a downstream end of the multilayer unit. The ultrasonic transducers are disposed to project into a flow in the multilayer unit. In the thus-configured physical quantity measurement device, the entry of water droplets into the multilayer unit in which ultrasonic waves propagate can be substantially prevented and the adhesion of water droplets to the ultrasonic transducers can be substantially prevented. Thus, the physical quantity measurement device can prevent deterioration in transmission and reception of ultrasonic waves in an ultrasonic propagation path and measure the flow rate of a fluid and the concentration of components contained in the fluid.

In the physical quantity measurement device according to the present disclosure, the secondary flow path provided outside the primary flow path including the multilayer unit is positioned below the primary flow path in the gravity direction. Furthermore, the ultrasonic transducers are disposed to project into a flow in the multilayer unit. Since the physical quantity measurement device is thus configured, the entry of water droplets into the ultrasonic propagation path can be substantially prevented and the adhesion of water droplets to the ultrasonic transducers can be substantially prevented. Thus, even when the measurement target fluid flowing into the physical quantity measurement device contains water droplets, the flow rate of the measurement target fluid and the concentration of components contained in the measurement target fluid can be measured.

DETAILED DESCRIPTIONS

Hereinafter, embodiments of the present invention will be described with reference to the drawings. Descriptions that are more detailed than necessary may, however, be omitted. For example, detailed descriptions on already well-known matters and overlapping descriptions on substantially the same configurations may be omitted.

Note that the accompanying drawings and the following descriptions are provided to help those skilled in the art fully understand the present disclosure, and do not intend to thereby restrict the subject matter recited in the claims.

Embodiment 1

Embodiment 1 will be described using FIG. 1 to FIG. 4.

Figure 1:
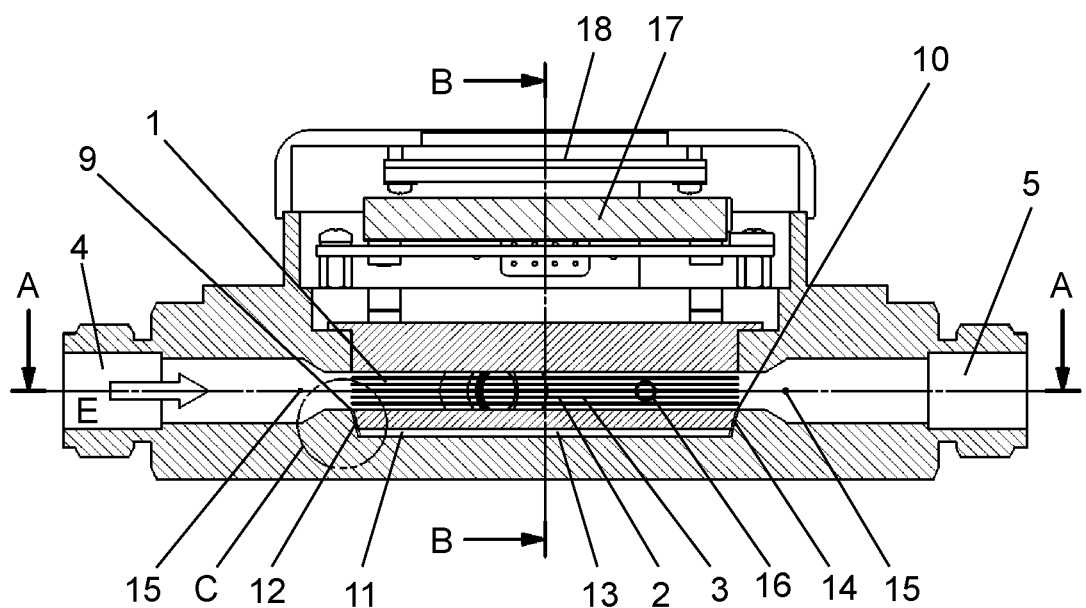
FIG. 1 is a cross-sectional view of a configuration example of a physical quantity measurement device in Embodiment 1.
Figure 2:
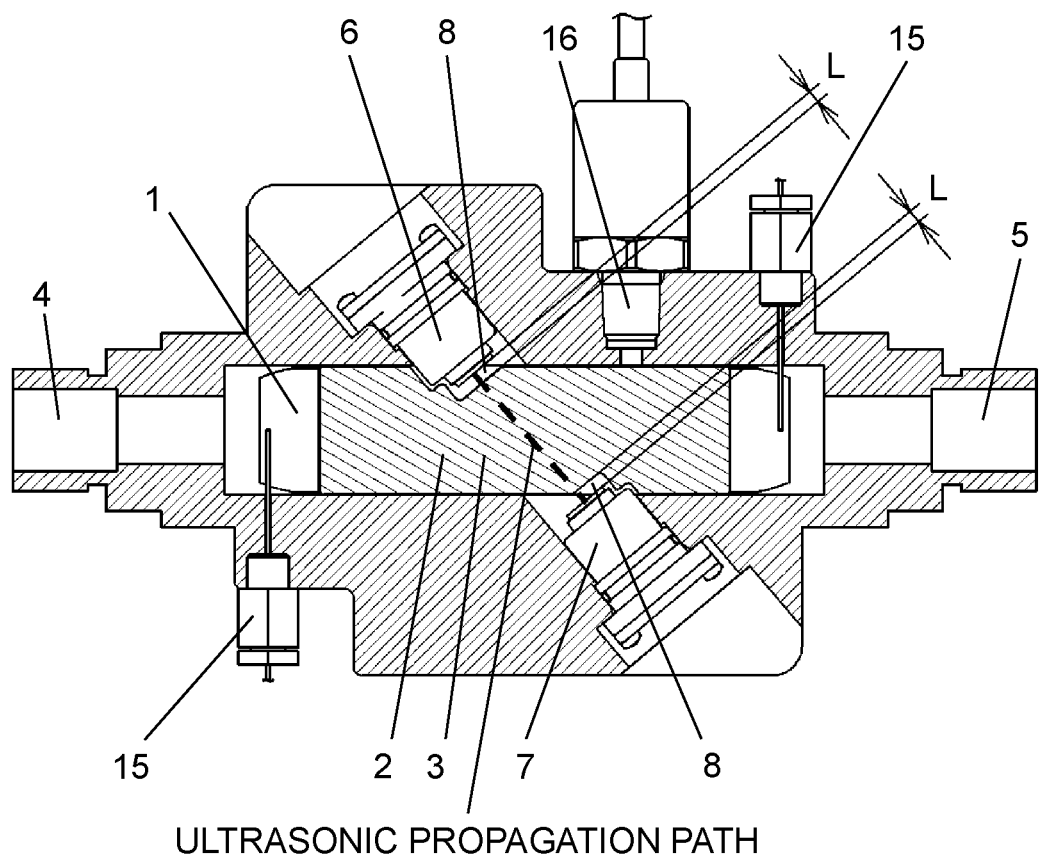
FIG. 2 is a plan view taken along line A-A in FIG. 1.
Figure 3:
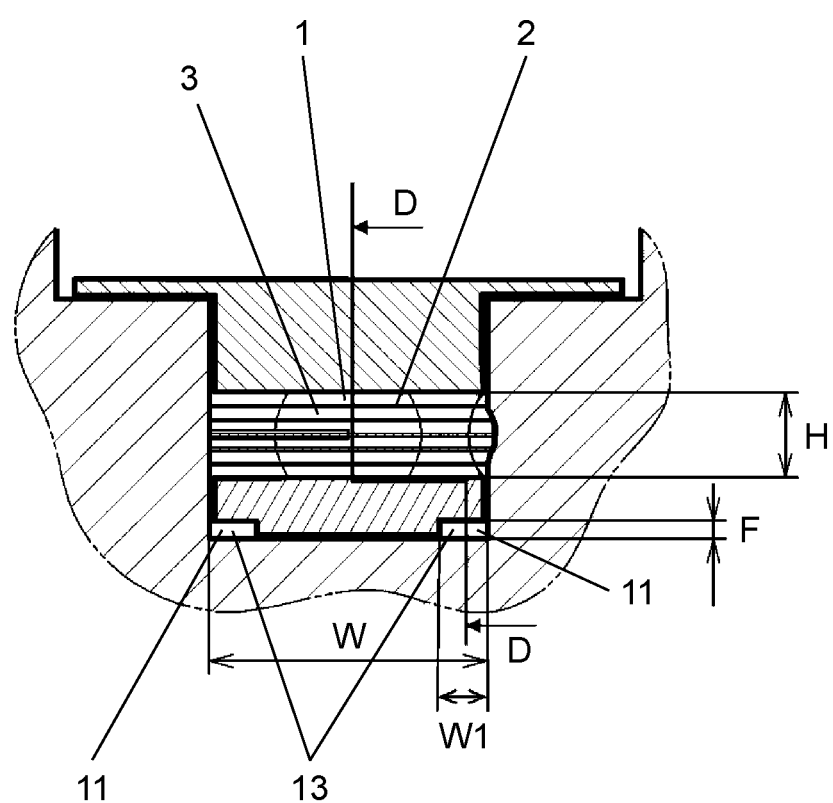
FIG. 3 is a transverse cross-sectional view of a flow path section taken along line B-B in FIG. 1.
Figure 4:
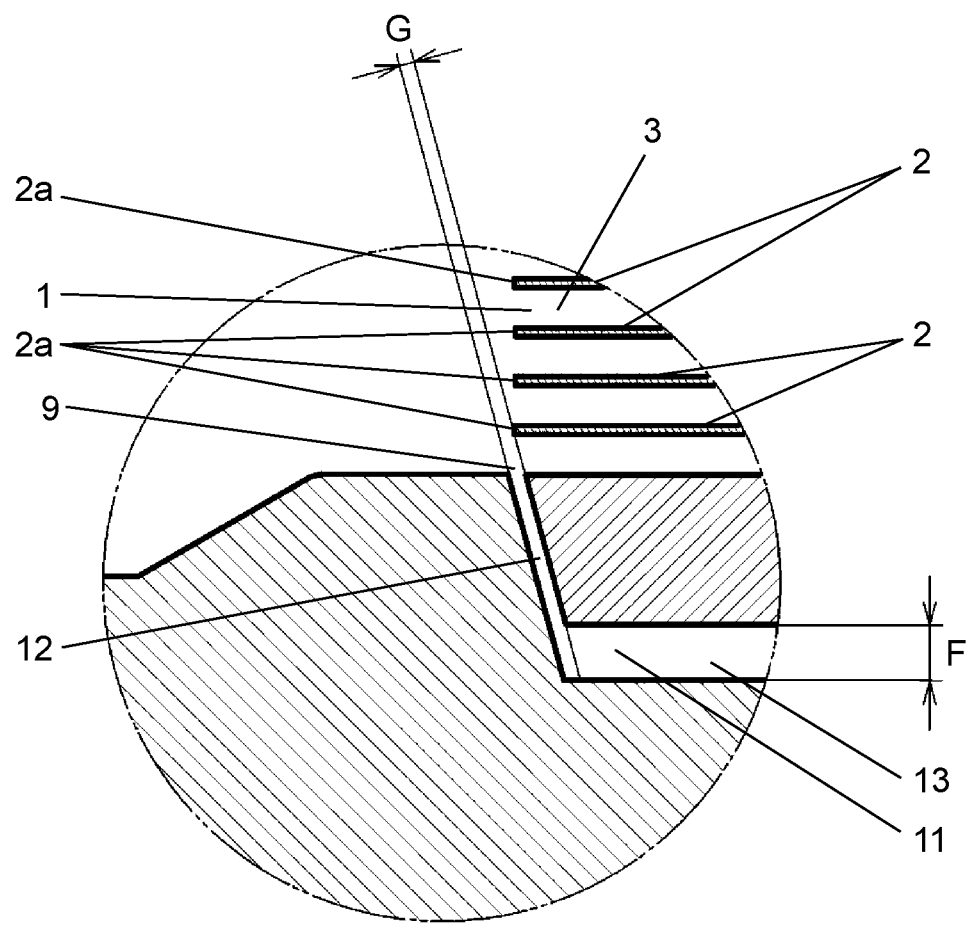
FIG. 4 is an enlarged view of the entrance side of a secondary flow path in Embodiment 1.
Figure 5:
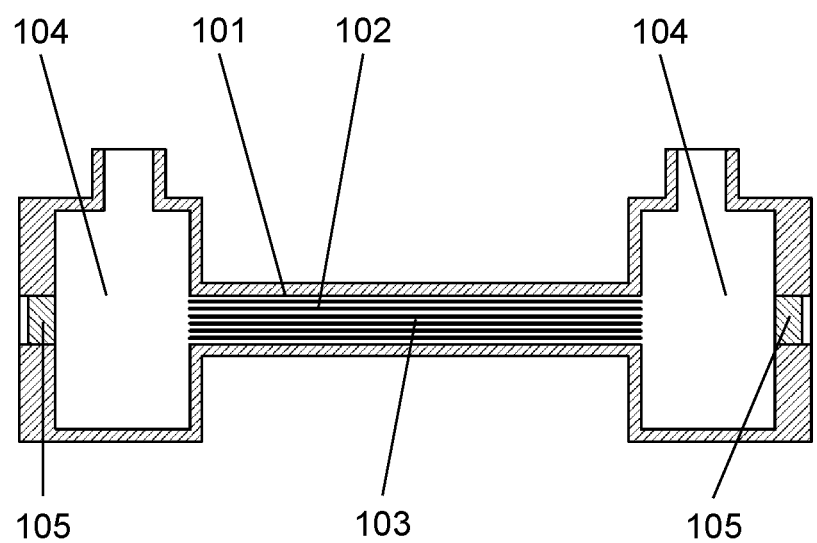
FIG. 5 is a cross-sectional view of a configuration of a conventional ultrasonic flowmeter.

FIG. 1 is a cross-sectional view of a configuration example of physical quantity measurement device 20 in Embodiment 1. FIG. 2 is a plan view taken along line A-A in FIG. 1. FIG. 3 is a transverse cross-sectional view of a flow path section taken along line B-B in FIG. 1. FIG. 4 is an enlarged view of the entrance side of secondary flow path 11 in Embodiment 1, that is, an enlarged view of section C in FIG. 1. Note that, to make the structure of secondary flow path 11 more understandable, a cross section taken along line D-D in FIG. 3 is illustrated in FIG. 1.

As illustrated in FIG. 1, physical quantity measurement device 20 includes inlet port 4 through which a measurement target fluid (hereinafter, also simply referred to as "the fluid") flows in and outlet port 5 through which the measurement target fluid flows out. As illustrated in FIG. 3, a cross section of primary flow path 1 in which the flow rate of a measurement target fluid and the concentration of components in the fluid are measured has a rectangular shape having a long side as width W and a short side as height H. Primary flow path 1 is divided into a plurality of layers stacked in the vertical direction of the cross section by a plurality of partition plates 2 disposed substantially horizontally, whereby multilayer unit 3 is formed. Note that, in the present embodiment, primary flow path 1 is divided by five partition plates 2 into six layers vertically stacked on top of one another.

Thus, there is formed a flow path in which the aspect ratio of the cross section of each of the layers is increased to realize a two-dimensional flow. As illustrated in FIG. 2, in multilayer unit 3, in order to make ultrasonic waves obliquely pass through a fluid flowing through multilayer unit 3, a pair of ultrasonic transducers 6, 7 is disposed at the substantial center of multilayer unit 3 in the lamination direction so as to face each other and be oblique to the fluid flowing through multilayer unit 3. Accordingly, in physical quantity measurement device 20, one of paired ultrasonic transducers 6, 7 (in the case of the example illustrated in FIG. 3, ultrasonic transducer 6) is disposed on the upstream side of the fluid flowing through multilayer unit 3, meanwhile the other of paired ultrasonic transducers 6, 7 (in the case of the example illustrated in FIG. 3, ultrasonic transducer 7) is disposed on the downstream side of the fluid flowing through multilayer unit 3. In physical quantity measurement device 20, an ultrasonic propagation path is thus formed.

Furthermore, ultrasonic transducer 6 on the upstream side and ultrasonic transducer 7 on the downstream side are disposed to partially project into multilayer unit 3, that is, into the flow of the fluid. In order to make ultrasonic transducers 6, 7 project into the flow of the fluid, notch 8 is provided in each partition plate 2. Furthermore, in order to prevent ultrasonic transducers 6, 7 from coming into contact with partition plates 2, gap L is provided between an end of each of ultrasonic transducers 6, 7, the end serving as a ultrasonic wave transmission-and-reception part, and partition plates 2. The dimension of gap L in notch 8 is set so that, when water droplets contained in the measurement target fluid accumulate and adhere to a surface of partition plate 2 under surface tension, the water droplets are prevented from staying at the ends of ultrasonic transducers 6, 7 or the water droplets fall.

As illustrated in FIG. 1, in physical quantity measurement device 20, upstream opening 9 is provided below (gravitationally below) the vicinity of the upstream end of multilayer unit 3 formed by partition plates 2; downstream opening 10 is provided below (gravitationally below) the vicinity of the downstream end of multilayer unit 3; and secondary flow path 11 configured to connect upstream opening 9 to downstream opening is provided. Furthermore, secondary flow path 11 configured to connect upstream opening 9 to downstream opening 10 is disposed gravitationally below primary flow path 1 (in FIG. 1, located lower than primary flow path 1).

Specifically, secondary flow path 11 includes: slit-shaped upstream opening 9; upstream inclined path 12 extending obliquely downward in the gravity direction from upstream opening 9 and leading to one end (upstream end) of each of two water paths 13; two water paths 13 disposed gravitationally below the bottom of primary flow path 1 and extending in parallel to each other; downstream inclined path 14 extending obliquely upward from the other end of each of two water paths 13 and leading to downstream opening 10; and slit-shaped downstream opening 10. Note that, specifically, as illustrated in FIG. 4, slit-shaped upstream opening 9 has a long and narrow rectangular shape having a short side as gap G and a long side as width W, and the long side extends in the same direction as the long side of the rectangular cross section of primary flow path 1. Slit-shaped downstream opening 10, although not illustrated, has the same shape as that of upstream opening 9, that is, a long and narrow rectangular shape having a short side as gap G and a long side as width W, and the long side extends in the same direction as the long side of the rectangular cross section of primary flow path 1. Furthermore, both upstream inclined path 12 and downstream opening 10 have a rectangular cross section having a long side as width W and a short side as gap G, and upstream opening 9 and downstream opening 10 are connected to two water paths 13. As illustrated in FIG. 3, two water paths 13 are disposed respectively at both ends of the long side (width W) of the rectangular cross section of primary flow path 1. Both two water paths 13 have a rectangular cross section having width WI and height F. Height F of the flow path is set so that, when water in an assumed amount flows in, water can flow without staying.

As described above, in physical quantity measurement device 20, secondary flow path 11 is provided gravitationally below primary flow path 1. Furthermore, in a state in which physical quantity measurement device 20 is used, primary flow path 1 and secondary flow path 11 are disposed slightly inclined on the whole so that the downstream side is located gravitationally lower than the upstream side.

As illustrated in FIG. 2, a pair of temperature sensors 15 are provided on the upstream side and the downstream side of primary flow path 1, respectively. Temperature sensors 15 are positioned so as not to affect the flow of the fluid flowing through the multilayer flow path in which measurements are performed. Furthermore, temperature sensors 15 are positioned so that, by equalizing temperatures measured with two temperature sensors 15, a temperature of the measurement target fluid in the ultrasonic propagation path can be calculated. Furthermore, to measure the pressure of the fluid flowing through the same layer as the ultrasonic propagation path, pressure sensor 16 is provided to cover a plurality of middle layers of multilayer unit 3.

The pair of ultrasonic transducers 6, 7, temperature sensors 15, and pressure sensor 16 are electrically connected to signal processor 17 (not illustrated). Signal processor 17 receives signals from the pair of ultrasonic transducers 6, 7, temperature sensors 15, and pressure sensor 16, and measures the flow velocity and the flow rate of the measurement target fluid and furthermore measures the concentration of components in the measurement target fluid. Results of the measurements by signal processor 17 are displayed on display unit 18.

Next, an operation of physical quantity measurement device 20 in the present embodiment will be described.

As illustrated in FIG. 1, the measurement target fluid, that is, a gas flowing through primary flow path 1 and containing water droplets, flows in from inlet port 4 in the direction of hollow arrow E. At this time, some of the water droplets fall downward by gravity. Next, some of the remaining water droplets collide with upstream end 2a of partition plate 2 of multilayer unit 3 provided in primary flow path 1, and fall downward. The water droplets having fallen by gravity and the water droplets having fallen after a collision with upstream end 2a of partition plate 2 flow into secondary flow path 11 from slit-shaped upstream opening 9 opened in the vicinity of upstream end 2a in multilayer unit 3.

The water droplets having flown into secondary flow path 11 from upstream opening 9 flow into either or both of two water paths 13 provided in the bottom of the flow path via tapered upstream inclined path 12. Water path 13 is set to have an appropriate flow path height F as illustrated in FIG. 3, whereby water droplets are prevented from staying therein and water droplets can more easily flow therethrough. The water droplets flowing through water path 13 flow out of slit-shaped downstream opening 10 via downstream inclined path 14 extending obliquely upward from downstream opening 10, and join the flow of primary flow path 1 and flow out of outlet port 5.

In physical quantity measurement device 20, primary flow path I and water paths 13 of secondary flow path 11 are disposed inclined obliquely downward in the gravity direction. Thus, the flow of the water droplets in secondary flow path 11 is caused by a gravity action owing to water path 13 of secondary flow path 11 inclined downward in the gravity direction and an inducement action of the flow of the fluid flowing out of multilayer unit 3.

Thus, the entry of water droplets into multilayer unit 3 is substantially prevented. However, some of water droplets having not fallen at the upstream end of partition plate 2 of multilayer unit 3 may remain in the measurement target fluid. However, the remaining water droplets adhere to partition plate 2 and flow away on the surface of partition plate 2 toward the downstream side, and therefore, the remaining water droplets are prevented from directly adversely affecting the propagation of ultrasonic waves in the ultrasonic propagation path.

Furthermore, even when minute water droplets remaining in the measurement target fluid flow into layers of multilayer unit 3, the minute water droplets collide with side surfaces of ultrasonic transducers 6, 7 and adhere thereto because both ultrasonic transducers 6, 7 project into the flow path, and thus the adhesion of the minute water droplets to the surfaces of ultrasonic transducers 6, 7 that affects transmission and reception of ultrasonic waves is prevented.

Thus, in physical quantity measurement device 20, the formation of a large-sized waterdrop in multilayer unit 3 is prevented, and the influence of minute water droplets on ultrasonic transducers 6, 7 is reduced, so that ultrasonic waves can be transmitted and received with sufficient accuracy between ultrasonic transducers 6, 7.

On the other hand, paired temperature sensors 15 are disposed on the upstream side and the downstream side of primary flow path 1, respectively, so as to be kept away from multilayer unit 3. Thus, in physical quantity measurement device 20, by equalizing temperatures measured with two temperature sensors 15, an accurate temperature of the measurement target fluid in the ultrasonic propagation path can be calculated.

Furthermore, to measure the pressure of the measurement target fluid flowing through the same layer as the ultrasonic propagation path, pressure sensor 16 is disposed so that a pressure receiving surface thereof covers a plurality of middle layers of multilayer unit 3, as illustrated in FIG. 1. Thus, physical quantity measurement device 20 can measure accurate pressure.

In physical quantity measurement device 20, by making use of thus obtained propagation time required for transmission and reception of ultrasonic waves by the pair of ultrasonic transducers 6, 7, the flow velocity and the flow rate of the measurement target fluid can be determined with a well-known propagation time reciprocal difference method.

Furthermore, in physical quantity measurement device 20, based on the sound velocity of the measurement target fluid obtained using the propagation time required for transmission and reception of ultrasonic waves and measured values of temperature sensors 15, the concentration of components contained in the measurement target fluid can be determined using a well-known method.

When the concentration of the components contained in the measurement target fluid is determined, a pressure value measured by pressure sensor 16 is used for correction if conversion to a standard condition is needed.

As described above, in physical quantity measurement device 20 in the present embodiment, secondary flow path 11 can prevent the entry of water droplets into multilayer unit 3 in which ultrasonic waves propagate. Furthermore, ultrasonic transducers 6, 7 are disposed to project into primary flow path 1, whereby the adhesion of the water droplets to ultrasonic transmission-and-reception surfaces of ultrasonic transducers 6, 7 can be substantially prevented. Thus, even when the measurement target fluid flowing into physical quantity measurement device 20 contains water droplets, physical quantity measurement device 20 can measure the flow rate of the measurement target fluid and the concentration of the components contained in the measurement target fluid.

Note that, in the present embodiment, there was described a configuration example in which multilayer unit 3 is formed by a plurality of partition plates 2 disposed to be substantially horizontal to each other in primary flow path 1, but the present disclosure is not limited by the configuration example. For example, multilayer unit 3 may be configured with partition plates 2 vertically disposed. This configuration allows water droplets having collided with partition plate 2 to more easily run down partition plate 2.

Furthermore, in the present embodiment, there was described a configuration example in which paired temperature sensors 15 are provided on the upstream side and the downstream side of the flow path, respectively, but the present disclosure is not limited by the configuration example. For example, when the fluid has a smaller temperature gradient, only one temperature sensor may be provided. In this case, cost reduction can be achieved.

Furthermore, in the present embodiment, there was described a configuration example in which the pressure receiving surface of pressure sensor 16 is disposed horizontally to partition plates 2 (that is, in the right-and-left direction in FIG. 3) to face a plurality of middle layers of multilayer unit 3, but the present disclosure is not limited by the configuration example. For example, pressure sensor 16 may be disposed to be vertical to partition plates 2 (that is, the top-and-bottom direction in FIG. 3) on the outermost layer side of multilayer unit 3. For example, in a configuration in which pressure sensor 16 is disposed on the signal processor 17 side (that is, on the upper side in FIG. 3), the configuration can be more compact and lower in cost, for example, a control board unit constituting signal processor 17 and pressure sensor 16 are integrally disposed or connection wiring is achieved.

Furthermore, in physical quantity measurement device 20, the concentration of components can be measured by a sensor other than an ultrasonic wave sensor, such as a thermal sensor or a hydrogen sensor.

Furthermore, in the present embodiment, there was described an example of the mixing of water droplets into a measurement target fluid in physical quantity measurement device 20, but the present disclosure is not limited by the example. In physical quantity measurement device 20, the same effect against not only water droplets but also liquid droplets other than water droplets can be achieved.

As described above, a physical quantity measurement device according to a first disclosure includes: a primary flow path having a rectangular cross section and configured to allow a measurement target fluid to flow therethrough; a multilayer unit in which partition plates configured to divide the primary flow path into a plurality of layers are disposed; a pair of ultrasonic transducers disposed in the multilayer unit; an upstream opening provided on the upstream side of the multilayer unit; a downstream opening provided on the downstream side of the multilayer unit; a secondary flow path disposed outside the multilayer unit and configured to connect the upstream opening to the downstream opening; a temperature sensor configured to detect a temperature of the measurement target fluid; and a signal processor configured to receive signals from the pair of the ultrasonic transducers and a signal from the temperature sensor and measure the flow rate of a fluid and the concentration of components in the fluid. The secondary flow path is positioned below the primary flow path in the gravity direction. The upstream opening is disposed in the vicinity of the upstream end of the multilayer unit, meanwhile the downstream opening is disposed in the vicinity of the downstream end of the multilayer unit. The ultrasonic transducers are disposed to project into the flow in the multilayer unit. In the thus-configured physical quantity measurement device, the entry of water droplets into the multilayer unit in which ultrasonic waves propagate can be substantially prevented and the adhesion of water droplets to the ultrasonic transducers can be substantially prevented. Thus, the physical quantity measurement device is capable of preventing deterioration in transmission and reception of ultrasonic waves in an ultrasonic propagation path and measuring the flow rate of a fluid and the concentration of components contained in the fluid even when the fluid flowing into the physical quantity measurement device contains water droplets.

INDUSTRIAL APPLICABILITY

As described above, according to the present disclosure, there can be provided a physical quantity measurement device capable of causing water droplets contained in a fluid to flow into a secondary flow path and substantially preventing the entry of the water droplets into a primary flow path. Thus, there can be realized a very versatile physical quantity measurement device that is applicable to not only a configuration including both a flow meter and a component measuring device but also a configuration including a flow meter or a component measuring device.

REFERENCE MARKS IN THE DRAWINGS

1 . . . primary flow path
2 . . . partition plate
2a . . . upstream end
3 . . . multilayer unit
4 . . . inlet port
5 . . . outlet port
6, 7 . . . ultrasonic transducer
8 . . . notch
9 . . . upstream opening
10 . . . downstream opening
11 . . . secondary flow path
12 . . . upstream inclined path
13 . . . water path
14 . . . downstream inclined path
15 . . . temperature sensor
16 . . . pressure sensor
17 . . . signal processor
18 . . . display unit
20 . . . physical quantity measurement device
67 . . . ultrasonic transducer
101 . . . measurement flow path
102 . . . partition plate
103 . . . multilayer flow path
104 . . . chamber
105 . . . ultrasonic transducer

What is claimed is:

1. A physical quantity measurement device, comprising:
a primary flow path having a rectangular cross section and configured to allow a measurement target fluid to flow through the primary flow path;
a multilayer unit in which a partition plate is disposed, the partition plate being configured to divide the primary flow path into a plurality of layers;
a pair of ultrasonic transducers disposed in the multilayer unit;
an upstream opening provided on an upstream side of the multilayer unit;
a downstream opening provided on a downstream side of the multilayer unit;
a secondary flow path disposed outside the multilayer unit and configured to connect the upstream opening to the downstream opening;
a temperature sensor configured to detect a temperature of the measurement target fluid; and
a signal processor configured to receive signals from the pair of the ultrasonic transducers and a signal from the temperature sensor and measure a flow rate of the measurement target fluid and a concentration of a component in the measurement target fluid,
wherein the secondary flow path is positioned below the primary flow path in a gravity direction,
wherein the upstream opening is disposed at an upstream end of the multilayer unit, and
wherein the ultrasonic transducers are disposed to project into a flow of the measurement target fluid in the multilayer unit.

2. A physical quantity measurement device, comprising:
a primary flow path configured to allow a measurement target fluid to flow through the primary flow path;
a multilayer unit in which a partition plate is disposed, the partition plate being configured to divide the primary flow path into a plurality of layers;

an upstream opening provided on an upstream side of the multilayer unit;

a downstream opening provided on a downstream side of the multilayer unit;

a secondary flow path configured to allow water droplets to flow through the secondary flow path; and a pair of ultrasonic transducers configured to measure a propagation time of ultrasonic waves in the measurement target fluid flowing through the primary flow path, wherein the upstream opening is disposed at an upstream end of the multilayer unit.

3. The physical quantity measurement device of claim 2, wherein the secondary flow path is positioned below the primary flow path in a gravity direction.

4. The physical quantity measurement device of claim 2, wherein the pair of ultrasonic transducers are disposed to project into the primary flow path.

5. The physical quantity measurement device of claim 4, further comprising a partition plate configured to divide the primary flow path into a plurality of layers.

6. The physical quantity measurement device of claim 1, wherein the partition plate includes a notch that provides a gap between one of the pair of ultrasonic transducers and the partition plate.

7. The physical quantity measurement device of claim 1, wherein the secondary flow path has an opening at a position where the opening allows water that collides with an upstream end of the partition plate and fall downward to flow into the secondary flow path through the opening.

8. A physical quantity measurement device, comprising:
a primary flow path configured to allow a measurement target fluid to flow through the primary flow path;
a multilayer unit in which a partition plate is disposed, the partition plate being configured to divide the primary flow path into a plurality of layers;
an upstream opening provided on an upstream side of the multilayer unit;
a downstream opening provided on a downstream side of the multilayer unit;
a secondary flow path configured to allow liquid droplets to flow through the secondary flow path; and
a measurement instrument configured to measure a flow rate of the measurement target fluid flowing through the primary flow path or a concentration of a component in the measurement target fluid,
wherein the upstream opening is disposed at an upstream end of the multilayer unit.

9. The physical quantity measurement device of claim 8, wherein the secondary flow path is positioned below the primary flow path in a gravity direction.

10. The physical quantity measurement device of claim 9, further comprising a partition plate configured to divide the primary flow path into a plurality of layers.

11. The physical quantity measurement device of claim 10, wherein the secondary flow path has an opening at a position where the opening allows liquid droplets that collide with an upstream end of the partition plate and fall downward to flow into the secondary flow path through the opening.

12. The physical quantity measurement device of claim 1, wherein the primary flow path and the secondary flow path are inclined so that a downstream side is located gravitationally lower than an upstream side.

13. The physical quantity measurement device of claim 3, wherein the pair of ultrasonic transducers are disposed to project into the primary flow path.

14. The physical quantity measurement device of claim 5, wherein the partition plate includes a notch that provides a gap between one of the pair of ultrasonic transducers and the partition plate.

15. The physical quantity measurement device of claim 5, wherein the secondary flow path has an opening at a position where the opening allows water that collides with an upstream end of the partition plate and fall downward to flow into the secondary flow path through the opening.

16. The physical quantity measurement device of claim 2, wherein the primary flow path and the secondary flow path are inclined so that a downstream side is located gravitationally lower than an upstream side.

17. The physical quantity measurement device of claim 8, wherein the primary flow path and the secondary flow path are inclined so that a downstream side is located gravitationally lower than an upstream side.

18. A physical quantity measurement device, comprising:
a primary flow path configured to allow a measurement target fluid to flow through the primary flow path;
a secondary flow path configured to allow liquid droplets to flow through the secondary flow path;
a measurement instrument configured to measure a flow rate of the measurement target fluid flowing through the primary flow path or a concentration of a component in the measurement target fluid; and
a partition plate configured to divide the primary flow path into a plurality of layers,
wherein the secondary flow path has an opening at a position where the opening allows liquid droplets that collide with an upstream end of the partition plate and fall downward to flow into the secondary flow path through the opening.

19. The physical quantity measurement device of claim 18, wherein the secondary flow path is positioned below the primary flow path in a gravity direction.

20. The physical quantity measurement device of claim 18, wherein the primary flow path and the secondary flow path are inclined so that a downstream side is located gravitationally lower than an upstream side.

21. The physical quantity measurement device of claim 18, wherein the partition plate includes a notch that provides a gap between one of the pair of ultrasonic transducers and the partition plate.

22. The physical quantity measurement device of claim 18, wherein the liquid droplets are water.

* * * * *